US008448425B2

(12) United States Patent
Hermansson et al.

(10) Patent No.: US 8,448,425 B2
(45) Date of Patent: May 28, 2013

(54) ENGINE SYSTEM AND A METHOD FOR A REGENERATION OF AN EXHAUST GAS TREATMENT DEVICE IN SUCH A SYSTEM

(75) Inventors: Jonas Hermansson, Lindome (SE); Anders Johnsson, Gothenborg (SE)

(73) Assignee: Volvo Car Corporation, Göteborg (SE)

( * ) Notice: Subject to any disclaimer, the term of this patent is extended or adjusted under 35 U.S.C. 154(b) by 732 days.

(21) Appl. No.: 12/339,415

(22) Filed: Dec. 19, 2008

(65) Prior Publication Data

US 2009/0158714 A1  Jun. 25, 2009

(30) Foreign Application Priority Data

Dec. 21, 2007 (EP) ...................................... 07150388

(51) Int. Cl.
*F01N 3/20* (2006.01)

(52) U.S. Cl.
USPC ..................... 60/295; 60/285; 60/286; 60/300

(58) Field of Classification Search
USPC ......... 60/285, 286, 295, 300, 301; 123/198 F, 123/481
See application file for complete search history.

(56) References Cited

U.S. PATENT DOCUMENTS

| 4,587,938 | A * | 5/1986 | Kobayashi et al. | 123/406.44 |
|---|---|---|---|---|
| 6,014,955 | A * | 1/2000 | Hosotani et al. | 123/399 |
| 6,276,333 | B1 * | 8/2001 | Kazama et al. | 123/399 |
| 6,955,155 | B2 * | 10/2005 | Surnilla | 123/339.11 |
| 7,143,727 | B1 * | 12/2006 | Winstead et al. | 123/90.15 |
| 7,156,082 | B2 * | 1/2007 | Winstead et al. | 123/625 |
| 2003/0224907 | A1 | 12/2003 | Surnilla | |
| 2004/0118107 | A1 * | 6/2004 | Ament | 60/284 |
| 2006/0086085 | A1 * | 4/2006 | Wang et al. | 60/295 |
| 2007/0012030 | A1 * | 1/2007 | Shirakawa | 60/285 |
| 2007/0144148 | A1 * | 6/2007 | Colignon | 60/286 |
| 2007/0266701 | A1 * | 11/2007 | Cheng | 60/295 |
| 2008/0004158 | A1 * | 1/2008 | Carl et al. | 477/107 |

FOREIGN PATENT DOCUMENTS

| DE | 10142669 | 4/2003 |
|---|---|---|
| DE | 10319288 | 12/2003 |
| EP | 0935056 | 8/1999 |
| EP | 1745836 | 1/2007 |
| WO | 01/49976 | 7/2001 |

OTHER PUBLICATIONS

ISA European Patent Office, International Search Report of EP0715388, Jun. 6, 2008, 1 page.

* cited by examiner

*Primary Examiner* — Thomas Denion
*Assistant Examiner* — Jorge Leon Jr.
(74) *Attorney, Agent, or Firm* — Alleman Hall McCoy Russell & Tuttle LLP

(57) ABSTRACT

The invention involves an engine system and a method for an engine system comprising an internal combustion engine comprising at least one cylinder, and an exhaust system comprising an exhaust gas treatment device, in which engine system the admittance of air and fuel is controllable by means of air flow control means and fuel control means, the method comprising performing an exhaust gas treatment device regeneration. The method comprises controlling, during the exhaust gas treatment device regeneration, the air flow control means and the fuel control means so as to provide a mixture to the exhaust gas treatment device with a lambda value of at least 1.0.

16 Claims, 5 Drawing Sheets

ENGINE SYSTEM AND A METHOD FOR A REGENERATION OF AN EXHAUST GAS TREATMENT DEVICE IN SUCH A SYSTEM

CROSS REFERENCE TO PRIORITY APPLICATION

This present application claims priority to European Application Number 07150388, filed Dec. 21, 2007, entitled "An Engine System and a Method for Regeneration of an Exhaust Gas Treatment Device in such a System", the entire contents of which are incorporated herein by reference.

TECHNICAL FIELD

The present invention relates to an engine system, and a method for an engine system comprising an internal combustion engine comprising at least one cylinder, and an exhaust system comprising an exhaust gas treatment device, in which engine system the admittance of air and fuel is controllable by means of air flow control means and fuel control means, the method comprising performing an exhaust gas treatment device regeneration.

BACKGROUND

Modern vehicles are equipped with exhaust gas treatment devices, known as catalytic converters, that convert toxic gases such as hydrocarbons (HC), carbon monoxide (CO) and nitrogen oxides (NOx) into substances such as carbon dioxide ($CO_2$), nitrogen ($N_2$) and water ($H_2O$). A known problem with catalytic converters is that certain substances can remain, for example by physical or chemical adsorption, on internal surfaces of the converters, and reduce the capacity of the converters. Such detrimental adsorption is known as catalytic converter poisoning. For example, fuels, whether gasoline or diesel, for vehicle internal combustion engines, contain a relatively high amount of sulfur, typically depending on in which state or region they are provided. The sulfur creates problems for the operation of the catalyst exhaust gas treatment devices. In the engine combustion process, the sulfur is converted to sulfur oxides (SOx), which adsorbs strongly to internal surfaces of the catalyst and therefore reduces its exhaust gas treatment capacity. This process is often referred to as sulfur poisoning. Sulfur adsorption is particularly strong during low load driving conditions.

A number of catalytic converter regeneration measures to solve this problem have been suggested. It is well known that the catalytic converter can be restored from sulfur poisoning (i.e., subjected to sulfur regeneration) by being exposed to high temperatures.

It is also known, for example through US2003/0224907A1 or EP0931923A1, to allow fuel into non-combusting cylinders, to be combusted with air in a catalytic converter in the exhaust system. Such combustion in the catalytic converter can be used to heat it for sulfur regeneration. A problem encountered at such sulfur regeneration is that high temperatures can occur at the upstream end of the catalytic converter, threatening to damage it. Also, at downstream portions of the catalytic converter, the temperature might not be high enough during regeneration to provide effective restoration from sulfur poisoning.

SUMMARY OF THE INVENTION

It is an object of the present invention to provide optimum efficiency of an exhaust gas treatment device.

It is also an object of the present invention to improve regeneration of exhaust gas treatment devices in engine systems with internal combustion engines.

It is a further object of the present invention to provide regeneration of exhaust gas treatment devices in engine systems with a minimal amount of increase in the complexity of the engine system.

These objects are reached with a method of the kind mentioned initially, comprising controlling, during at least a portion of the exhaust gas treatment device regeneration, the air flow control means and the fuel control means so as to provide a mixture to the exhaust gas treatment device with a lambda value of at least 1.0.

As is known in the art, the lambda value is defined as the actual air/fuel ratio divided by the stoichiometric air/fuel ratio, and a mixture with a lambda value of at least 1.0 is a lean mixture. The inventors have discovered during tests that reducing the fuel content in the mixture provided to the exhaust system will reduce the temperature at the upstream end of the exhaust gas treatment device. An explanation to this could be that a reduced fuel content will reduce the rate of combustion of the mixture. Assuming that the gas flow is essentially constant, a reduced combustion rate will result in a larger portion of the combustion taking place further downstream in the exhaust gas treatment device. As a result, the temperature at the upstream end of the exhaust gas treatment device will be reduced, and the temperature in regions further downstream will be increased. In turn, this will reduce risks of damage at the upstream end of the exhaust gas treatment device, and also provide for an effective regeneration of downstream regions of the device.

In other words, the invention provides for controlling the temperature distribution in the exhaust gas treatment device. More specifically, the air control means and the fuel control means can be controlled by an engine control unit (ECU) to obtain an air/fuel ratio being based, at least partly, on a desired temperature distribution in the exhaust gas treatment device. The result is a very effective regeneration and minimization of risks of the regeneration measure causing damage to the catalytic converter. This thorough regeneration is provided simply by use of the fuel control means, without the need for additional equipment in the engine system. The regeneration according to the invention is a powerful measure providing a fast removal of sulfur deposits in the entire exhaust gas treatment device.

It should specially be noted that a low medium temperature in the exhaust gas treatment device is known to stimulate sulfur remaining in the device. In most vehicles IS during normal driving, the temperature in the downstream region of the exhaust gas treatment device presents the lowest medium temperature. Thus, the invention providing for increasing the temperature in downstream regions of the exhaust gas treatment device, effectively remedies this problem.

Optionally, the lambda value of the mixture provided to the exhaust gas treatment device is not lower than 1.25 and not higher than 2.0. The tests performed by the inventors have shown that within this lambda interval, very favorable results regarding the exhaust gas treatment device temperature distribution can be accomplished.

The invention is specially suitable to engine systems where the admittance of air and fuel into the at least one cylinder is controllable by means of the air flow control means and the fuel control means, and where, as is exemplified below, the exhaust gas treatment device regeneration comprises inhibiting combustion in at least one of the cylinders, and controlling the fuel control means so that fuel is allowed into at least one of the cylinders in which combustion is inhibited.

Optionally, where the exhaust gas treatment device regeneration comprises inhibiting combustion in at least one of the cylinders, and controlling the fuel control means so that fuel is allowed into at least one of the cylinders in which combustion is inhibited, the method comprises controlling, during at least a portion of the exhaust gas treatment device regeneration, by means of the air flow control means, the air flow into any of the cylinders in which combustion is inhibited and into which fuel is allowed, so that it is reduced. The combustion inhibition will, of course, allow air flowing into the cylinders to continue through them. Since the airflow is reduced, i.e., less than a maximum air flow, the engine system can be well-prepared for changing operational conditions. If, for example, during the exhaust gas treatment device regeneration, a driver of a vehicle in which the engine is provided requests additional torque by depressing an accelerator pedal, in order to meet the request, combustion might have to be allowed in all cylinders. Introducing combustion while fuel is allowed and the air flow is at a maximum could provide issues with the drivability of the vehicle.

In one embodiment, the method comprises controlling, during at least a portion of the exhaust gas treatment device regeneration, by means of the air flow control means, the air flow into any of the cylinders in which combustion is inhibited and into which fuel is allowed, so that it is below a threshold air flow. The threshold air flow could be such that the difference between the threshold air flow and a minimum air flow is not larger than twenty percent of the difference between a maximum air flow and the minimum air flow. For example, in a typical normal size private vehicle gasoline engine, the minimum air flow could be 0.3 grams per engine revolution, and the maximum air flow could be 1.5 grams per engine revolution, which means that the threshold air flow would be $(0.3+0.2*(1.5-0.3))=0.54$ grams per engine revolution.

Thus, the threshold, minimum and maximum air flows could refer to the air flow of the entire engine. However, in cases where the air flow can be controlled individually for cylinders or groups of cylinders, it would be more accurate that the threshold, minimum and maximum air flows refer to the air flow into individual cylinders in which combustion is inhibited and into which fuel is allowed.

The limitation of the air flow can be accomplished in a number of ways. Optionally, where the air flow control means comprises a throttle valve, the method comprises keeping the throttle valve closed during at least a portion of the exhaust gas treatment device regeneration.

The exhaust gas treatment device normally comprises at least one catalyst monolith. For this presentation a catalyst monolith located furthest upstream in the exhaust system (i.e., closest to the engine as seen opposite to the exhaust flow direction) is referred to as an upstream monolith. Optionally, the fuel control means are controlled, during at least a portion of the exhaust gas treatment device regeneration, so that the location in the exhaust gas treatment device of the maximum temperature is downstream of an upstream end of the upstream monolith. This is especially advantageous in combination with controlling the airflow as suggested above (i.e., to reduce the airflow), for example, by closing a throttle valve. The reason is that the air flow can be kept low in view of the drivability mentioned above, and the desired temperature distribution in the exhaust gas treatment device can be obtained by adjusting the fuel injected. More specifically, the air flow can be kept constant while the location in the exhaust gas treatment device of the maximum temperature can be moved downstream by reducing the amount of injected fuel, so as for the mixture to become leaner.

Since, as explained above, heating of downstream regions is advantageous, optionally, the fuel control means are controlled, during at least a portion of the exhaust gas treatment device regeneration, so that the location in the exhaust gas treatment device of the maximum temperature is not upstream of a threshold location, the distance between the threshold location and an upstream end of the upstream monolith being at least twenty percent of the extension of the upstream monolith in the exhaust flow direction. Optionally, said distance between the threshold location and an upstream end of the upstream monolith is at least fifty percent of the extension of the upstream monolith in the exhaust flow direction. Advantageously, where there is more than one monolith, the fuel control means can be controlled, during at least a portion of the exhaust gas treatment device regeneration, so that the location in the exhaust gas treatment device of the maximum temperature is in a downstream monolith.

It should be noted that the step of inhibiting combustion can comprise controlling ignition means at the cylinder(s) so that combustion is inhibited. Thereby, the method is adapted to spark ignition engines, at which ignition is inhibited during at least one operative cycle of the cylinder(s) during which cycle fuel is allowed to the cylinder. Alternatively or in addition to, ignition inhibition, the combustion inhibition could comprise controlling at least one exhaust valve at at least one of the cylinders into which fuel is allowed so as to reduce or eliminate an increase in pressure in the cylinder. Thereby, a valve control system, in itself known to the person skilled in the art, can be used to open the exhaust valve(s) when at a compression stroke of the cylinder the piston is moving from the bottom dead center to the top dead center.

While example objects are listed above, these should not be seen as necessarily limiting the scope of protection only to embodiments that achieve these objects. For example, other embodiments are possible, which may achieve different advantages, such as a method for an engine system including an internal combustion engine having at least one cylinder, and an exhaust system having an exhaust gas treatment device, the method comprising performing an exhaust gas treatment device sulfur regeneration operation, and moving a location of a peak temperature along a length in a flow direction of the exhaust gas treatment device, the peak temperature location moved by adjusting an air-fuel ratio of combustion in the cylinder.

DESCRIPTION OF THE FIGURES

Below, the invention will be described in detail with reference to the drawings, in which.

DETAILED DESCRIPTION

Figure 1:
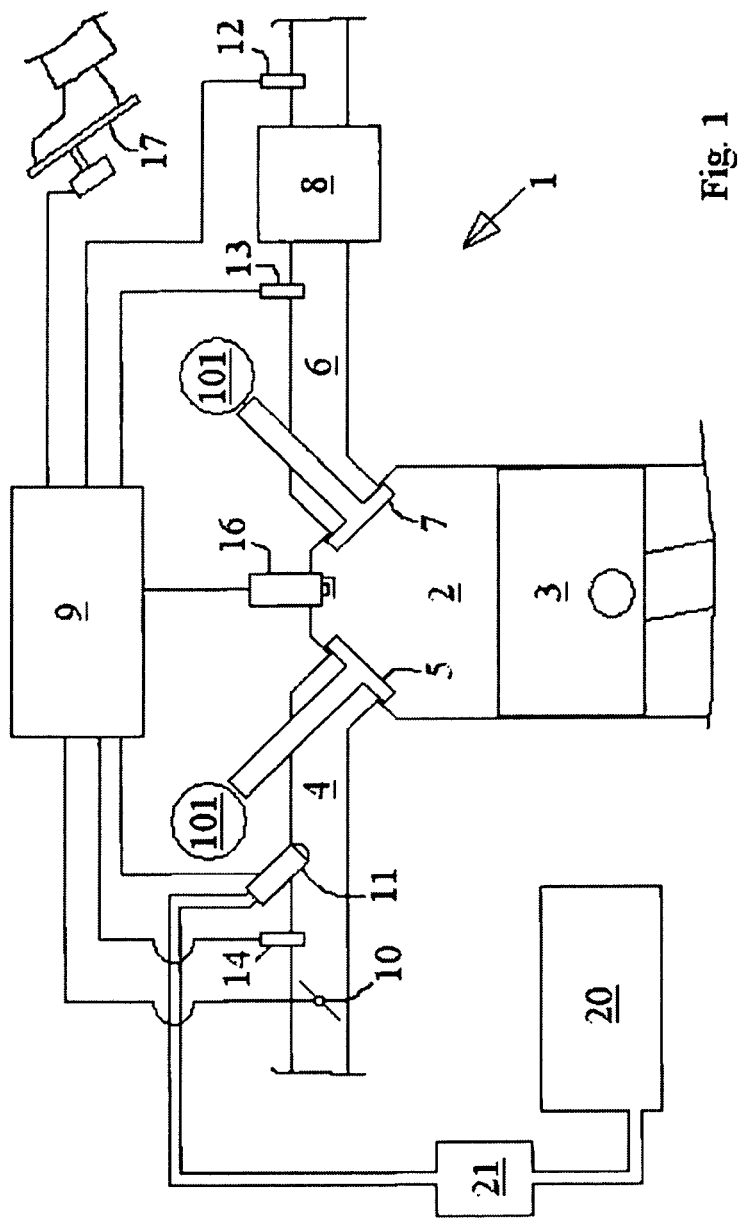
FIG. 1 shows a schematic view of parts of a vehicle engine system.

FIG. 1 shows a schematic view of parts of a vehicle engine system 1 comprising an internal combustion engine. The engine comprises four cylinders 2, of which only one is shown in FIG. 1, each with a reciprocating piston 3, each of which is connected to a crankshaft of the engine. It should be noted that the invention is applicable to engines with any number of cylinders. Communication between each cylinder 2 and an inlet duct 4 is controlled by at least one respective inlet valve 5. An exhaust system 6, 8 is provided downstream from the cylinders, and which exhaust system comprises an exhaust duct 6 and an exhaust gas treatment device, in the form of a catalytic converter 8. Communication between each cylinder 2 and the exhaust duct 6 is controlled by at least one respective exhaust valve 7.

The engine system 1 also comprises an engine control unit (ECU) 9, which can be provided as one unit, or as more than one logically interconnected physical units.

The ECU 9 is adapted to control air flow control means comprising a throttle valve 10. The throttle valve 10 is to be used for controlling the air flow into the cylinders. As an alternative to, or in addition to a throttle valve 10, the air flow control means can comprise, as indicated in FIG. 1, control means 101 for the inlet valve(s) 5 and/or the exhaust valve(s) 7, for example, in the form of a variable valve timing (VVT) system and/or a cam profile shifting (CPS) system. Such inlet and/or exhaust valve control means can be used as an alternative or in addition to the throttle valve 10 for controlling the air flow into the cylinders.

In addition, the ECU 9 is also adapted to determine the engine air flow based on signals received from an air flow sensor 14 located in the inlet duct 4. As an alternative, as is known in the art, the air flow can be computed based on parameters such as the inlet manifold pressure, throttle position, engine speed, inlet temperature, and atmospheric pressure. Manners of determining the values of these parameters are known in the art and not explained further here.

The ECU 9 is also adapted to control fuel control means 11 comprising at least one fuel injector in the inlet duct 4. In this embodiment, where the engine presents more than one cylinder, the fuel injection can be controlled individually for each cylinder, by a fuel injector being provided at a separate portion of the inlet duct 4 communicating with the respective cylinder (i.e., port fuel injection). Alternatively, as is known in the art, a fuel injector can be provided in each cylinder 2 (i.e., direct fuel injection). As a further is alternative, one single fuel injector can be provided for more than one cylinder, or all cylinders, for example, at an upstream portion of the inlet duct communicating with more than one cylinder or all cylinders. The fuel control means 11 communicate with fuel storage means in the form of a fuel tank 20, via a fuel pump 21.

It should be noted that, in a manner known in the art, the ECU 9 is adapted to control the air flow control means and the fuel control means so that a desired air/fuel ratio is obtained.

At each cylinder, ignition means 16 comprising a spark plug are provided and controllable individually by the ECU 9. In this example, the four cylinders of the engine are arranged in a straight line and, numbering the cylinders according to their spatial sequence, the normal ignition sequence of the engine is 1-3-4-2.

The ECU 9 is adapted to determine the temperature of the catalytic converter 8 based at least partly on the air flow, the lambda value, the ambient temperature, engine load and engine rotational speed. As an alternative, the ECU 9 can be adapted to receive signals from a temperature sensor located in the exhaust duct 6 between the cylinders 2 and the catalytic converter 8, based on which signals, the catalytic converter temperature can be determined.

The ECU 9 is also adapted to receive signals from a downstream gas sensor 12 located downstream of the catalytic converter 8, as well as from an upstream gas sensor 13 located in the exhaust duct 6 between the cylinders 2 and the catalytic converter 8. The ECU 9 is adapted to determine, based on the signals from the first and second sensors 12, 13, the oxygen content in the exhaust gases upstream and downstream, respectively, of the catalytic converter 8. As is known in the art, the oxygen content in the exhaust gases is indicative of the lambda value of the air/fuel mixture provided to the engine.

The ECU 9 is adapted to determine, based at least partly on an analysis of a signal from the downstream gas sensor 12, the level of sulfur poisoning of the catalytic converter 8, and whether the catalytic converter 8 is subjected to sulfur poisoning, as described in the European patent application entitled "An internal combustion engine system and a method for determining a condition of an exhaust gas treatment device in a such a system", filed by the applicant on the first filing date of the present application, and incorporated herein by reference. Alternatively, the ECU 9 can be adapted to determine the level of sulfur poisoning of the catalytic converter 8, and whether the catalytic converter 8 is subjected to sulfur poisoning, by some alternative method. For example, a sulfur poisoning establishment procedure can include adjusting in the ECU 9 a sulfur oxide (SOx) adsorption counter, based on air-fuel ratio, engine operating condition, catalyst temperature, the engine rotational speed and the intake pressure.

The ECU is adapted to adjust, as known in the art, the value of a control parameter in the form of a requested torque parameter based on signals from an accelerator pedal 17 in the vehicle. The ECU 9 is also adapted to compare the requested torque to a first and a second requested torque threshold value. In this embodiment, the first requested torque threshold value is positive, and the second requested torque threshold value is zero. If the accelerator pedal 17 is released (i.e., un-depressed) the requested torque is determined to be zero or negative.

Figure 2:
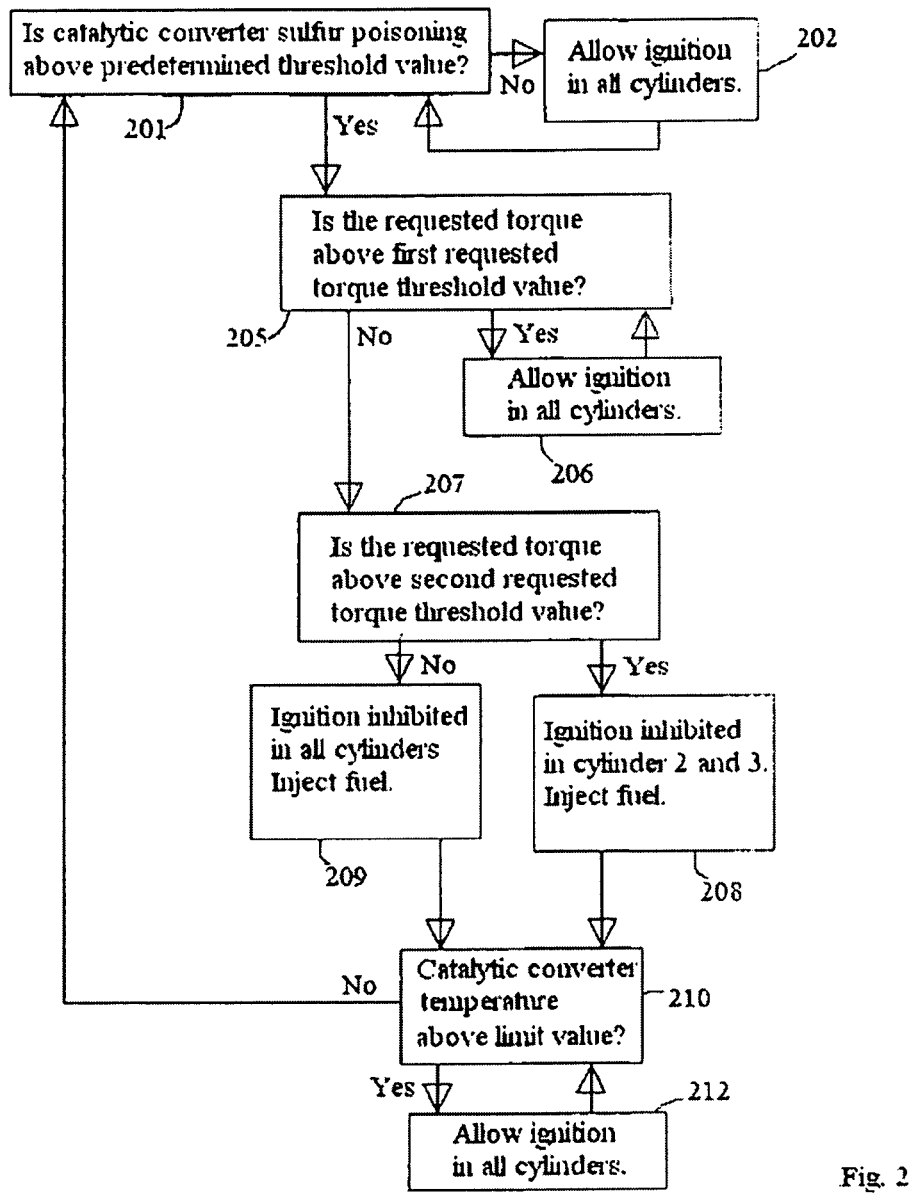
FIG. 2 shows a block diagram depicting a method according to an example embodiment of the invention.

FIG. 2 depicts a method according to an example embodiment of the invention. If it is determined 201 that the level of sulfur poisoning is not above a sulfur poisoning threshold value, no exhaust gas treatment device regeneration, specially no sulfur regeneration, is carried out, which means that ignition is allowed in all cylinders of the engine 202.

If it is determined that the level of sulfur poisoning is above the sulfur poisoning threshold value, it is determined 205 whether the requested torque is above the first requested torque threshold value. The first requested torque threshold value is chosen so that torque values at or below it correspond to positive, moderate torque values, sufficient for low load conditions. If it is determined that the requested torque is above the first requested torque threshold value, it is determined that no regeneration is carried out and ignition is allowed in all cylinders of the engine 206.

If it is determined that the requested torque is at or below the first requested torque threshold value, it is determined 207 whether the requested torque is above the second requested torque threshold value. The second requested torque threshold value is chosen so that torque values at or below it correspond to zero or negative torque values, typically occurring at a release of the accelerator pedal 17.

If it is determined 207 that the requested torque is above the second requested torque threshold value, the regeneration is carried out by inhibiting ignition in some of the cylinders, more specifically in cylinders no. 2 and 3, and allowing fuel injection into these cylinders 208. Thereby, the air and fuel is transported from the cylinders no. 2 and 3, through the exhaust duct 6. In cylinders no. 1 and 4, ignition is allowed, so that air and fuel injected can be combusted to meet output torque requirements. If it is determined 207 that the requested torque is at or below the second requested torque threshold value, the regeneration is carried out by inhibiting ignition and allowing fuel injection in all cylinders 209. Whether ignition is inhibited in one, only some or all cylinders, air and fuel is transported through the exhaust duct 6, so that the mixture reaches the catalytic converter 8 where it is combusted, as explained below with reference to FIG. 3, to increase the temperature of the converter 8 in order to eliminate sulfur deposits.

It should be noted that if the regeneration is terminated and ignition is allowed in all cylinders of the engine 212, for example, due to the catalytic converter temperature rising above the predetermined temperature limit value 210 or due to a torque above the first requested torque threshold value being requested 205, the regeneration can be "continued" in a suitable manner, once circumstances, as described above, allow such a "continuation" to take place.

If, during the regeneration, it is determined 201 that the level of sulfur poisoning has been reduced to the predetermined level, the regeneration is terminated 202 by allowing ignition in all cylinders.

If, during the regeneration, the requested torque is changed from zero, or a negative value, to a moderate positive value, a regeneration involving ignition inhibition in all cylinders can be changed to a regeneration involving ignition inhibition in only some of the cylinders. Contrarily, if the requested torque is changed from moderate positive value to zero, or a negative value, a regeneration involving ignition inhibition in only some of the cylinders can be changed to a regeneration involving ignition inhibition in all cylinders.

In the embodiment described above, the exhaust gas treatment device regeneration can run in any of two "modes", with combustion inhibited in all of the cylinders or in two of the cylinders, depending on the requested torque. However, alternatively, the number of such modes can be more than two.

Figure 3:
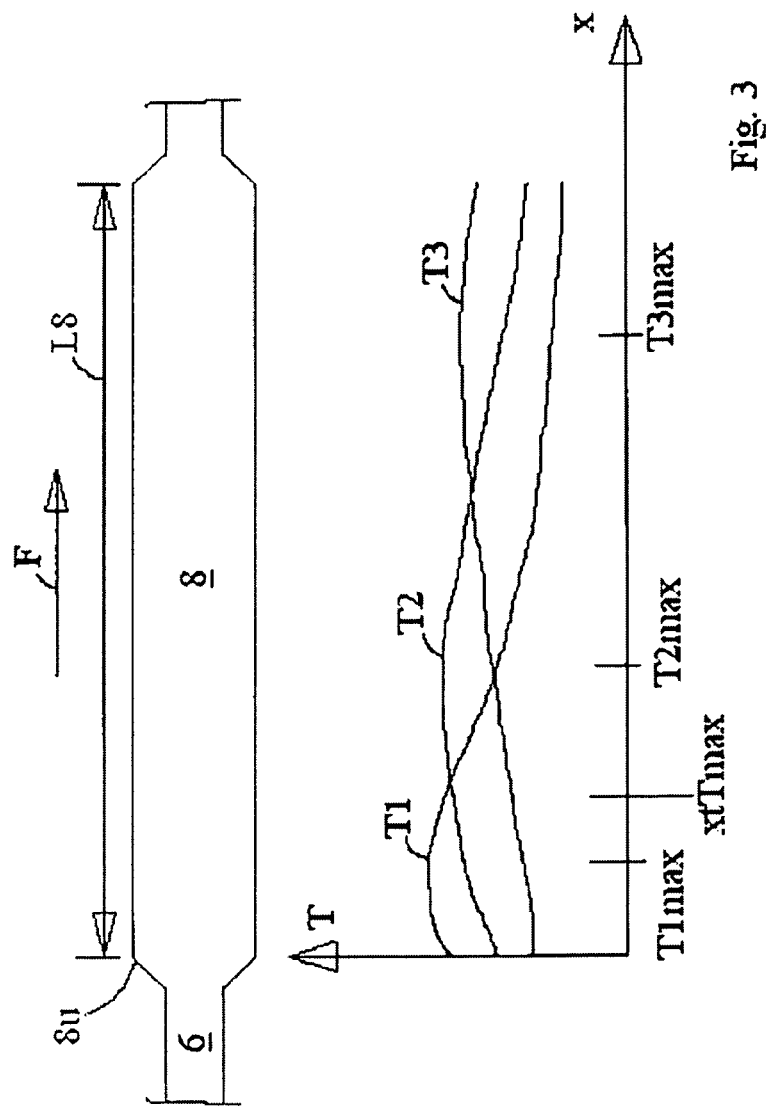
FIG. 3 is a schematic side view of a detail in FIG. 1 with a diagram depicting temperature distributions.

FIG. 3 shows schematically the catalytic converter 8 in FIG. 1, a gas flow direction being indicated with an arrow F. Optionally, during the regeneration, the air flow control means 101 are controlled so that the air flow is reduced, optionally minimized (e.g., by the throttle valve 10 being closed), or at least kept relatively low. As will be understood, decreasing the fuel injected, while retaining a constant air flow, will move the maximum temperature downstream in the catalytic converter.

The fuel control means 11 are used during the regeneration to control the location of a maximum temperature in the exhaust gas treatment device. By controlling the fuel control means 11 so that a first, relatively rich air/fuel mixture is provided to the catalytic converter 8, a main portion of the mixture will be combusted relatively far upstream in the catalytic converter 8. As a result, a first temperature distribution in the catalytic converter, indicated in FIG. 4 with the curve T1, will present a maximum, T1max, relatively far upstream.

The curve T2 shows a second temperature distribution during regeneration, with the same air flow as in the case of the first temperature distribution T1, but where the fuel control means 11 are controlled so that a second air/fuel mixture, leaner than the first air/fuel mixture, is provided to the catalytic converter 8. As a result, the mixture will mainly be combusted further downstream in the catalytic converter 8, with a maximum temperature T2max further downstream than the maximum temperature T1max of the first temperature distribution T1.

Finally, by controlling the fuel control means 11, with the same air flow as in the case of the first and second temperature distributions T1, T2, to obtain a third air/fuel mixture, being leaner than the second air/fuel mixture, the mixture will be mainly combusted even further downstream in the catalytic converter 8. As a result, the temperature distribution T3 in the catalytic converter will present a maximum, T3max, further downstream.

Thus, the location of the maximum temperature can be changed, during the sulfur regeneration, which in turn makes it possible to obtain a particularly thorough regeneration, since it can be secured that the temperature is increased sufficiently for sulfur deposit removal throughout the entire catalytic converter.

Referring to FIG. 3, optionally, the fuel injection is controlled so that the location of the maximum temperature is not upstream of a threshold location, xtTmax, the distance between the threshold location and the upstream end 8$u$ of the catalytic converter 8 is at least twenty percent of the extension L8 of the catalytic converter 8 in the exhaust flow direction F.

Figure 5:
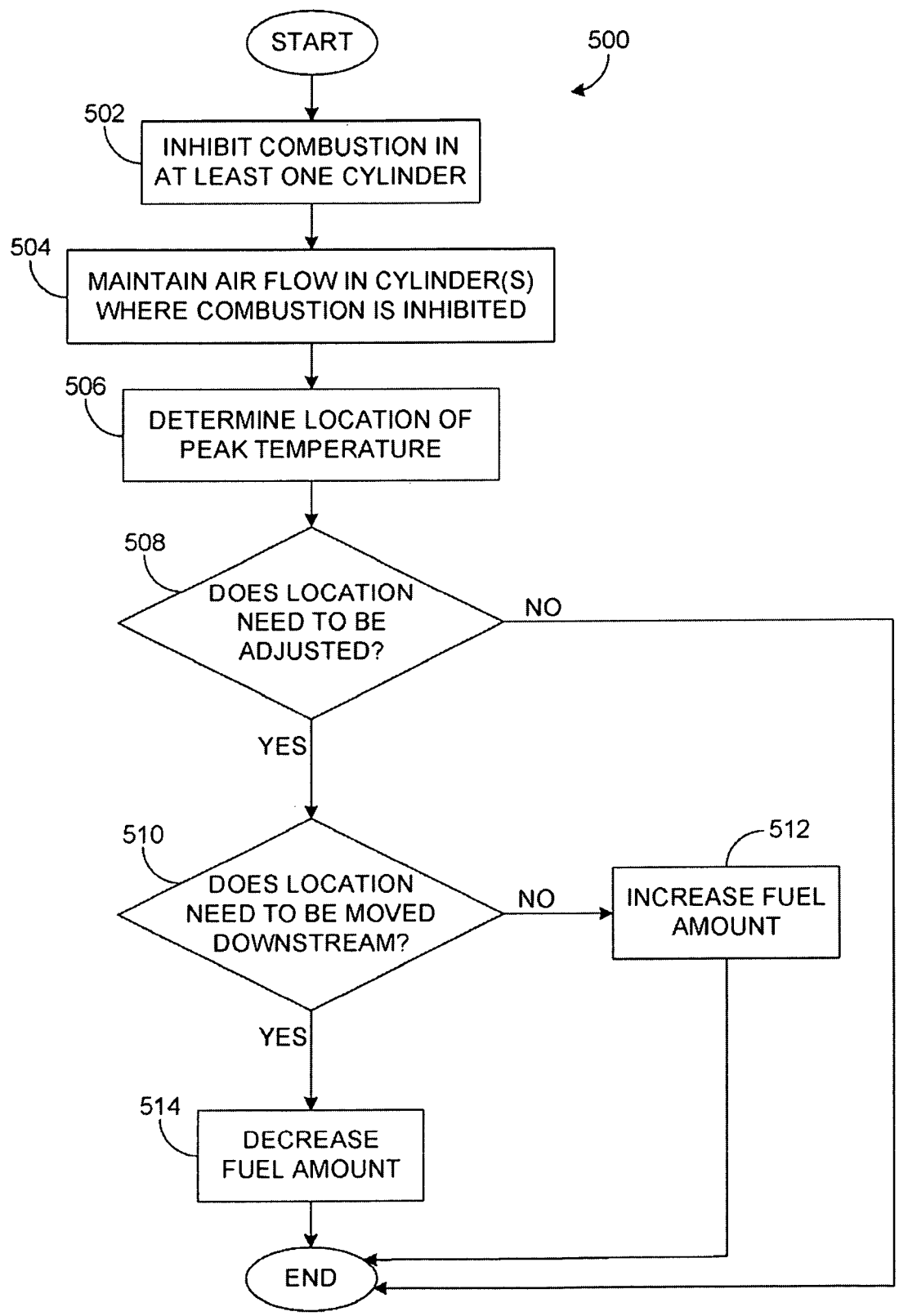
FIG. 5 shows a flow chart illustrating a method for performing a sulfur regeneration.

A method 500 for performing a sulfur regeneration is shown in the flow chart in FIG. 5. During the regeneration, combustion is inhibited in at least one of the cylinders 502. Air flow, however, is maintained at a minimum amount in the cylinder(s) where combustion is inhibited 504. The location of the peak temperature is determined 504 by the amount of fuel mixed with the air flow. As discussed above, the air/fuel mixture should be lean. If the location of the peak temperature needs to be adjusted 508 (e.g., moved downstream), the amount of fuel in the mixture can be increased or decreased by IS the fuel control means. In order to move the location of peak temperature downstream 510, the amount of fuel may be decreased 514. Conversely, increasing the amount of fuel 512, creates a less lean mixture and the location of the peak temperature moves upstream.

A temperature distribution control method has been suggested with reference to FIGS. 3 and 5, involving adjusting the fuel injected, while retaining a constant air flow, to move the maximum temperature downstream in the catalytic converter. It should be noted that in addition to the fuel control, the air flow can be adjusted during the regeneration, in order to control the catalytic converter temperature distribution. In such an embodiment, the throttle valve 10 can be used during the regeneration to control the location of a maximum temperature in the exhaust gas treatment device. By controlling the throttle valve 10 so that a relatively small air flow is provided, the air/fuel mixture will be combusted relatively far upstream in the catalytic converter 8. By controlling the throttle valve 10 so that larger air flows are provided, the air/fuel mixture will be combusted further downstream in the catalytic converter 8. In other words, increasing the air flow will move the maximum temperature downstream.

Figure 4:
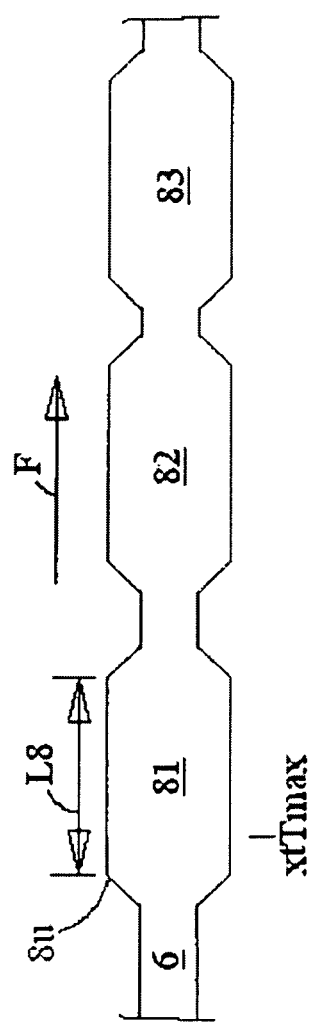
FIG. 4 is a schematic side view of an alternative to the detail shown in FIG. 3.

FIG. 4 schematically shows an alternative exhaust gas treatment device comprising three catalyst monoliths 81, 82, 83, of which an upstream monolith 81 is located closest to the engine opposite to an exhaust flow direction F. Similarly to what was suggested above, during regeneration, the fuel injection is controlled so that the location of the maximum temperature is not upstream of a threshold location, xtTmax. The threshold location is determined such that the distance between the threshold location, xtTmax, and an upstream end 8$u$ of the upstream monolith 81 is at least twenty percent of the extension L8 of the upstream monolith in the exhaust flow direction F.

During the catalytic converter regeneration, in order to control the catalytic converter temperature distribution, the air/fuel mixture is controlled dependent, at least partly, on a model stored by the ECU 9 for a temperature distribution in the catalytic converter. The model can be based on parameters such as the air/fuel mixture, engine speed, air flow, ignition timing and VVT-setting. As an alternative, during the catalytic converter regeneration, the air/fuel mixture can be controlled, in order to control the catalytic converter temperature distribution, at least partly in dependence on signals from a plurality of temperature sensors distributed so as to detect the temperature at locations along the catalytic converter.

Embodiments of a method for controlling, during catalytic converter regeneration, the air/fuel ratio based at least partly on a desired temperature distribution in the catalytic converter has been presented. As understood by the person skilled in the art, the mapping of air/fuel ratios to catalytic converter temperature distributions can be done in a test environment, and can involve adjusting the air/fuel ratio while monitoring the catalytic converter temperature distribution.

It should be noted that the invention is applicable to catalytic converter regenerations accomplished in a variety of manners, for example by the use of secondary air injected into the exhaust system to mix with fuel from non-combusting cylinders. Thereby, the air flow control means could comprise a pump for the secondary air injection. Another catalytic converter regeneration technique to which the invention is applicable involves allowing fuel vapors, or purge gas, to be pumped through un-combusting cylinders to the catalytic converter, for example as described in the EP application No. 06127167.2, filed by the applicant. Thereby, the fuel control means could comprise a valve or a pump for controlling the admittance of fuel vapors to the engine.

Besides exhaust gas treatment device poisoning caused by sulfur, the invention is equally applicable to poisoning caused by other substances, such as phosphorus. In particular, the invention results in the catalyst average temperature being kept higher, and as a result, long term phosphorus poisoning can be reduced.

The invention claimed is:

1. A method for an engine system comprising an internal combustion engine comprising a plurality of cylinders, an exhaust system comprising an exhaust gas treatment device, an air flow control means, and a fuel control means, the method comprising:
performing an exhaust gas treatment device regeneration, the regeneration including, controlling, during at least a portion of the exhaust gas treatment device regeneration, the air flow control means and the fuel control means so as to provide a mixture to the exhaust gas treatment device with a lambda value of at least 1.0, where the exhaust gas treatment device regeneration comprises inhibiting combustion in at least one of the plurality of cylinders during a cylinder cycle, and controlling the fuel control means so that fuel flows through the at least one of the plurality of cylinders in which combustion is inhibited during the cylinder cycle, and controlling the air flow control means so that an air flow is maintained through the at least one of the plurality of cylinders in which combustion is inhibited during the cylinder cycle, wherein the admittance of air and fuel into the at least one of the plurality of cylinders is controlled by means of the air flow control means and the fuel control means, wherein combustion is inhibited via inhibiting ignition from an ignition system including a spark plug, wherein the air flow control means and the fuel control means are adjusted in response to a desired temperature distribution in the exhaust gas treatment device, and further comprising adjusting a location of combustion in the exhaust gas treatment device to an upstream location in the exhaust gas treatment device via reducing air flow through the at least one of the plurality of cylinders in which combustion is inhibited.

2. The method according to claim 1, wherein the lambda value of the mixture provided to the exhaust gas treatment device is not lower than 1.25 and not higher than 2.0.

3. The method according to claim 1, comprising controlling, during at least a portion of the exhaust gas treatment device regeneration, via the air flow control means, the air flow into the at least one of the plurality of cylinders in which combustion is inhibited and into which fuel is allowed, so that it is reduced.

4. The method according to claim 1, further comprising controlling, during at least a portion of the exhaust gas treatment device regeneration, via the air flow control means, the air flow into the at least one of the plurality of cylinders in which combustion is inhibited and into which fuel is allowed, so that it is increased to adjust a location of combustion in the exhaust gas treatment device to a downstream location in the exhaust gas treatment device.

5. The method according to claim 1, wherein the admittance of air into the at least one of the plurality of cylinders in response to the exhaust gas treatment device regeneration is below a difference between a threshold air flow and a minimum air flow and is not larger than twenty percent of a difference between a maximum air flow and the minimum air flow.

6. The method according to claim 1, wherein the air flow control means comprises a throttle valve, the method further comprising keeping the throttle valve closed during at least a portion of the exhaust gas treatment device regeneration, and inhibiting combustion via reducing an increase in cylinder pressure via an exhaust valve.

7. The method according to claim 1, wherein the exhaust gas treatment device comprises at least one catalyst monolith, of which an upstream monolith is located furthest upstream in the exhaust system, the fuel control means being controlled, during at least a portion of the exhaust gas treatment device regeneration, so that a location in the exhaust gas treatment device of a maximum temperature is downstream of an upstream end of the upstream monolith, and where the air flow is reduced via an exhaust valve while the air flow is maintained through the at least one of the plurality of cylinders.

8. The method according to claim 7, wherein the fuel control means are controlled, during at least a portion of the exhaust gas treatment device regeneration, so that the location in the exhaust gas treatment device of the maximum temperature is not upstream of a threshold location, a distance between the threshold location and the upstream end of the upstream monolith being at least twenty percent of an extension of the upstream monolith in an exhaust flow direction.

9. An engine system comprising:
an internal combustion spark ignited engine comprising at least one cylinder;
an exhaust system comprising an exhaust gas treatment device;
an air flow control means;
a fuel control means;
an ignition system; and
an engine control unit, the engine control unit adjusting, during at least a portion of an exhaust gas treatment device regeneration, the air flow control means and the fuel control means so as to maintain air flow and fuel flow through a cylinder during a cylinder cycle in which combustion is inhibited via inhibiting ignition from the ignition system and to provide a mixture to the exhaust gas treatment device with a lambda value of at least 1, wherein, the lambda value is not lower than 1.25 and not higher than 2.0, wherein admittance of air and fuel into the cylinder is controlled by means of the air flow control means and the fuel control means, and wherein a fuel amount injected to the cylinder is decreased to increase a downstream temperature of the exhaust gas treatment device, wherein ignition means are provided at each cylinder, and the engine control unit adjusts, during the exhaust gas treatment device regeneration, the ignition means so as to inhibit combustion in the cylinder, and to control the fuel control means so that fuel is allowed into the cylinder in which combustion is inhibited, wherein the engine control unit adjusts, during at least a portion of the exhaust gas treatment device regeneration, by means of the air flow control means, a location of combustion in the exhaust gas treatment device to an upstream location in the exhaust treatment device via reducing air flow through the cylinder in which combustion is inhibited.

10. The engine system according to claim 9, wherein the engine control unit adjusts, during the exhaust gas treatment device regeneration, by means of the air flow control means, a location of combustion in the exhaust treatment device to a downstream location in the exhaust treatment device via increasing air flow through the cylinder in which combustion is inhibited.

11. The engine system according to claim 9, wherein the air flow control means comprises a throttle valve, the engine control unit adjusts the throttle valve closed during at least a portion of the exhaust gas treatment device regeneration.

12. The engine system according to claim 9, wherein the exhaust gas treatment device comprises at least one catalyst monolith, of which an upstream monolith is located furthest upstream in the exhaust system, the engine control unit adjusts the fuel control means, during at least a portion of the exhaust gas treatment device regeneration, so that a location in the exhaust gas treatment device of a maximum temperature is downstream of an upstream end of the upstream monolith.

13. The engine system according to claim 12, wherein the engine control unit adjusts the fuel control means, during at least a portion of the exhaust gas treatment device regeneration, so that the location in the exhaust gas treatment device of the maximum temperature is not upstream of a threshold location, a distance between the threshold location and the upstream end of the upstream monolith being at least twenty percent of an extension of the upstream monolith in an exhaust flow direction.

14. The engine system according to claim 13, wherein the distance between the threshold location and the upstream end of the upstream monolith is at least fifty percent of the extension of the upstream monolith in the exhaust flow direction.

15. A method for an engine system including an internal combustion engine having at least one cylinder, and an exhaust system having an exhaust gas treatment device, the method comprising:
 performing an exhaust gas treatment device sulfur regeneration operation; and
 moving a location of a peak temperature along a length in a flow direction of the exhaust gas treatment device, the peak temperature location moved by maintaining air flow and fuel flow through a cylinder during a cylinder cycle in which combustion is inhibited and adjusting an amount of air passing through the cylinder in which combustion is inhibited.

16. The method of claim 15, wherein the moving includes increasing an air-fuel ratio to move the peak temperature downstream, and decreasing the air-fuel ratio to move the peak temperature upstream, the increasing and decreasing of the air-fuel ratio further adjusting a temperature distribution in the exhaust gas treatment device, and where combustion is inhibited via reducing an increase in cylinder pressure via an exhaust valve.

* * * * *